United States Patent [19]
Minami et al.

[11] Patent Number: 5,742,698
[45] Date of Patent: Apr. 21, 1998

[54] AUTOMATIC IMAGE ADJUSTMENT DEVICE

[75] Inventors: Kouji Minami; Yoshiki Ono; Takehiko Morita, all of Tokyo, Japan

[73] Assignee: Mitsubishi Denki Kabushiki Kaisha, Tokyo, Japan

[21] Appl. No.: 658,229

[22] Filed: Jun. 4, 1996

[30] Foreign Application Priority Data

Jun. 5, 1995 [JP] Japan .................... 7-137873

[51] Int. Cl.⁶ .................................................. G06K 9/00
[52] U.S. Cl. ............................. 382/100; 382/294; 348/745
[58] Field of Search ................................ 382/100, 286, 382/287, 294; 348/745, 806, 807; 315/368.11; 345/10, 11, 12, 13, 204, 207

[56] References Cited

U.S. PATENT DOCUMENTS

| | | | |
|---|---|---|---|
| 5,475,447 | 12/1995 | Funado | 348/745 |
| 5,532,764 | 7/1996 | Itaki | 348/745 |
| 5,602,932 | 2/1997 | Macdonald et al. | 382/100 |

FOREIGN PATENT DOCUMENTS

| | | | |
|---|---|---|---|
| 3-38797 | 11/1991 | Japan | H04N 9/31 |
| 5-30520 | 2/1993 | Japan | H04N 9/31 |

Primary Examiner—Andrew W. Johns

[57] ABSTRACT

To provide an automatic image adjustment device that can automatically detect the display positions, display state, and the like of a test pattern displayed on a screen, the imaging angles of the mirror to image an adjustment pattern displayed at the positions corresponding to the vertices of a relatively small rectangle on a screen are first detected. According to the detected imaging angles, the CPU calculates the imaging angles for imaging the adjustment points at the four corners of the screen. Then, on the basis of the imaging angles for the adjustment points at the four corners, the imaging angles for the remaining adjustment points are calculated. Afterwards, the test pattern, such as the one used for convergence adjustment, can be displayed successively at the adjustment points, and the test pattern at each of the adjustment pattern can be imaged by the camera with the mirror being automatically set at the corresponding imaging angle. Thus, information on the display position, display states and the like of the test pattern can be automatically obtained and analyzed.

11 Claims, 10 Drawing Sheets

| | | 4 | | |
|---|---|---|---|---|
| $A_{11}$ · | $A_{12}$ · | $A_{13}$ · | $A_{14}$ · | $A_{15}$ · |
| $A_{21}$ · | $A_{22}$ · | $A_{23}$ · | $A_{24}$ · | $A_{25}$ · |
| $A_{31}$ · | $A_{32}$ · | $A_{33}$ · | $A_{34}$ · | $A_{35}$ · |
| $A_{41}$ · | $A_{42}$ · | $A_{43}$ · | $A_{44}$ · | $A_{45}$ · |
| $A_{51}$ · | $A_{52}$ · | $A_{53}$ · | $A_{54}$ · | $A_{55}$ · |

AUTOMATIC IMAGE ADJUSTMENT DEVICE

BACKGROUND OF THE INVENTION

The present invention relates to an automatic adjustment device for automatically performing the set-up adjustment, such as convergence adjustment of an image display device.

Figure 13:
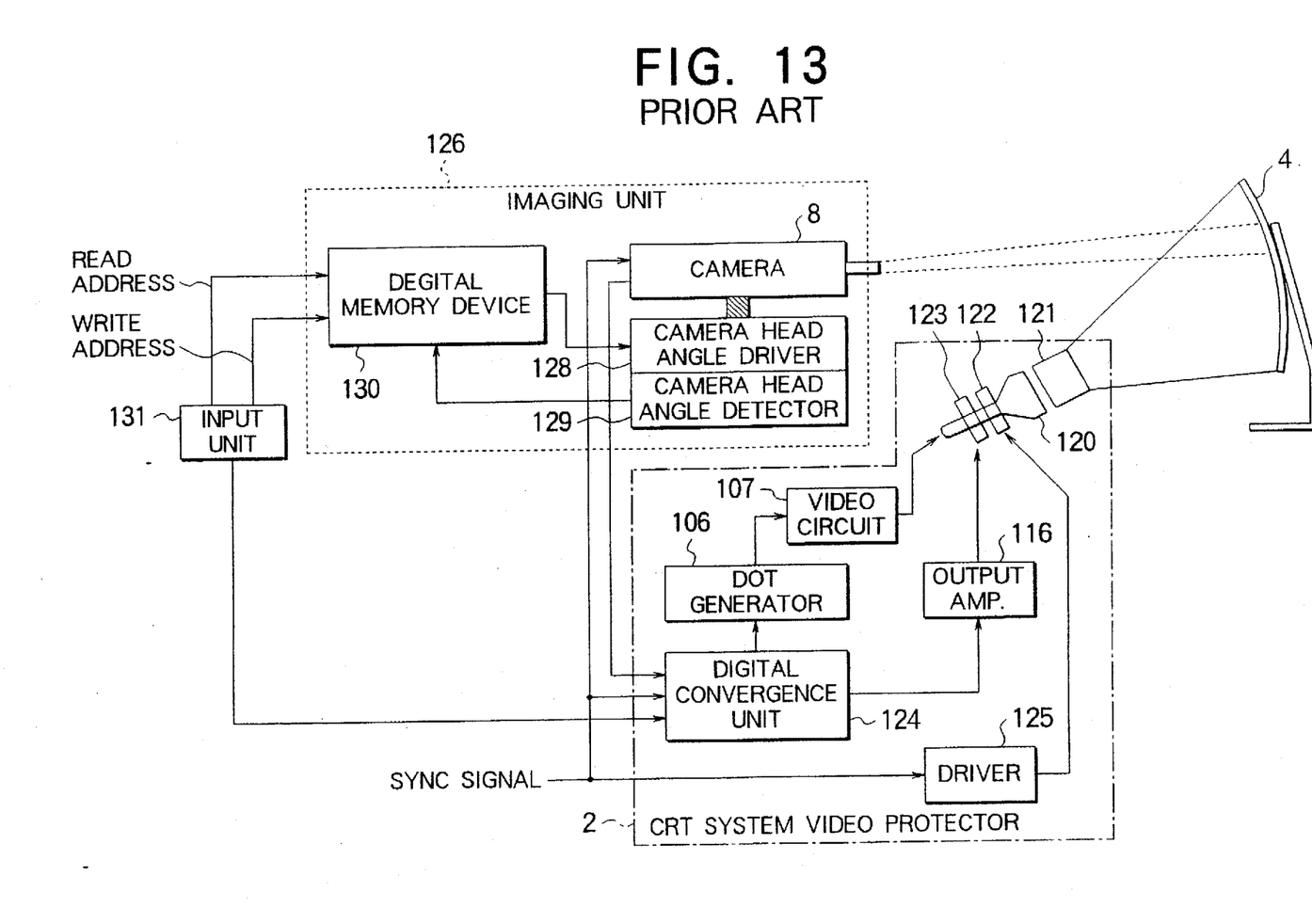
FIG. 13 is a block diagram showing the configuration of a convergence device for a conventional CRT system video projector.

FIG. 13 is a block diagram showing the configuration of a conventional convergence adjustment for a CRT type video projector, shown for example in Japanese Patent Kokoku Publication No. 38,797/1991. In the figure, reference numeral 2 denotes a CRT-type video projector, 4 denotes a screen, 106 denotes a dot generator, 107 denotes a video circuit, 116 denotes an output amplifier, 120 denotes a projection CRT, 121 denotes a projection lens, 122 denotes a deflection yoke, and 123 denotes a convergence yoke. Reference numeral 126 denotes an imaging unit, which comprises a camera 8, a camera head angle driver 128, a camera angle detector 129, and a digital memory 130. The camera head angle driver 128 directs the camera 8 to any arbitrary point on the screen 4. The camera angle detector 129 detects the position within the screen to which the camera is directed, on the basis of the angle of the camera 8. The digital memory 130 controls the camera head angle driver 128, and stores the positions of the adjustment points. The selection of the convergence adjustment point is input by the use of an input unit 131.

The operation will next be described. At the time of convergence adjustment, a dot pattern of the dot generator 106 is input to the video circuit 107. The convergence adjustment points are designated by the use of the input unit 131. The designation is converted at the digital memory 130 within a digital convergence unit 124 into data for controlling the camera head angle driver 128, to move the camera 8 to that direction. The camera 8 images part of the screen to obtain a magnified image of the imaged part. This is because it is necessary to obtain such a resolution to detect the shape of the image that result when the dot image is expanded due to expansion of the electron beam and/or blur of the optical system.

First, the dot generator 106 is controlled by a color signal selector in the digital convergence unit 124, to produce a green signal alone. On the basis of the output of the camera 8, information on the horizontal and vertical positions of the green dot pattern Formed by the green signal is obtained. Next, a red signal alone is produced by the action of the color signal selector, to obtain information on the horizontal and vertical positions of the red dot pattern produced by the red dot signal. The positions of the green and red dot patterns are compared, and the convergence adjustment data stored in the frame memory within the digital convergence unit 124 is increased or decreased, depending on the result of the comparison. The convergence adjustment data is D/A-converted, and passed through the output amplifier 116, to drive the convergence coil in the convergence yoke 123. The position of the red dot is thereby moved. By repeating the detection, comparison and modification of data, the green and red dots are made to coincide. The same operation is performed for the blue and green dots. The convergence adjustment at each designated adjustment point is thus automatically performed.

Because the conventional image adjustment device was configured as described above, it was necessary to designate, by manual input, the adjustment points, and the it took time and labor for the adjustment.

SUMMARY OF THE INVENTION

Accordingly, it is an object of the invention to provide an automatic image adjustment device which does not require manual input to designate the adjustment points in the image on the screen, and yet which is capable of automatic detection of the position, state and the like of test pattern displayed on the screen.

An automatic image adjustment device according to the invention images an area forming a part of a screen by means of an imaging means such as a camera, and first determines representation (such as coordinate values) of the driving position of the imaging means, such as imaging angles of the camera or mirror, or stepping motors driving it, in a state in which the imaging means is imaging an area of the screen. On the basis of the thus-determined representation of the driving position, an imaging position calculation means, including for instance a CPU, next determines the driving positions for imaging areas containing the vertices of a relatively small rectangle. On the basis of the thus-determined driving positions, the imaging position calculation means calculates the driving positions for imaging areas respectively containing adjustment points, which are typically arranged in an m×n matrix.

The determination of the driving positions for the adjustment points can be made for instance, by first calculating the driving positions for the adjustment points at the corners of the screen (i.e., of the m×n matrix), adjusting the driving positions by displaying an adjustment pattern with the imaging means being set or fixed at the calculated driving position, and then varying the driving position until a specific part (e.g., a center of gravity) of the adjustment pattern is at a specific part (e.g., center) of the imaged area, and then calculating, from the thus-determined driving positions for the adjustment points at the corners, the driving positions for the remaining adjustment points.

The driving positions for the adjustment points at the corners of the screen may not be calculated directly from the driving positions for the vertices of the relatively small rectangle, but may be determined on a step-by-step basis.

That is, on the basis of the driving positions for the vertices of the relatively small rectangle, driving positions for vertices of a second rectangle, which is larger than the first rectangle, on the screen are calculated. On the basis of the calculated driving positions, the true driving positions are determined by displaying an adjustment pattern, with the imaging means being set or fixed at the calculated driving position, and imaging the adjustment pattern, and varying the driving position until a specific part (e.g., center of gravity) of the adjustment pattern is at a specific part (e.g., center) of the imaged area.

When the true driving positions for the vertices of the second rectangle are found, then driving positions for the vertices of a third rectangle, which is even larger than the second rectangle are determined, in a manner similar to that in which the driving positions for the vertices of the second rectangle are determined. By repeating similar processes, driving positions for the vertices of the largest rectangle, i.e., the adjustment points at the corners of the screen can be determined.

After the driving positions for the respective adjustment points are determined, a test pattern may be displayed at each of the respective adjustment points, with the imaging means set at the corresponding driving position to image the test pattern being displayed. The imaged test pattern is used for adjustment of convergence, correction of raster distortion, or otherwise provide information on the position or state of the displayed test pattern.

The display at the respective adjustment points and imaging of the displayed test pattern are conducted automatically and successively, and the convergence adjustment and/or other test and adjustment can be performed without human intervention.

DETAILED DESCRIPTION OF THE PREFERRED EMBODIMENTS

Embodiment 1

Figure 1:
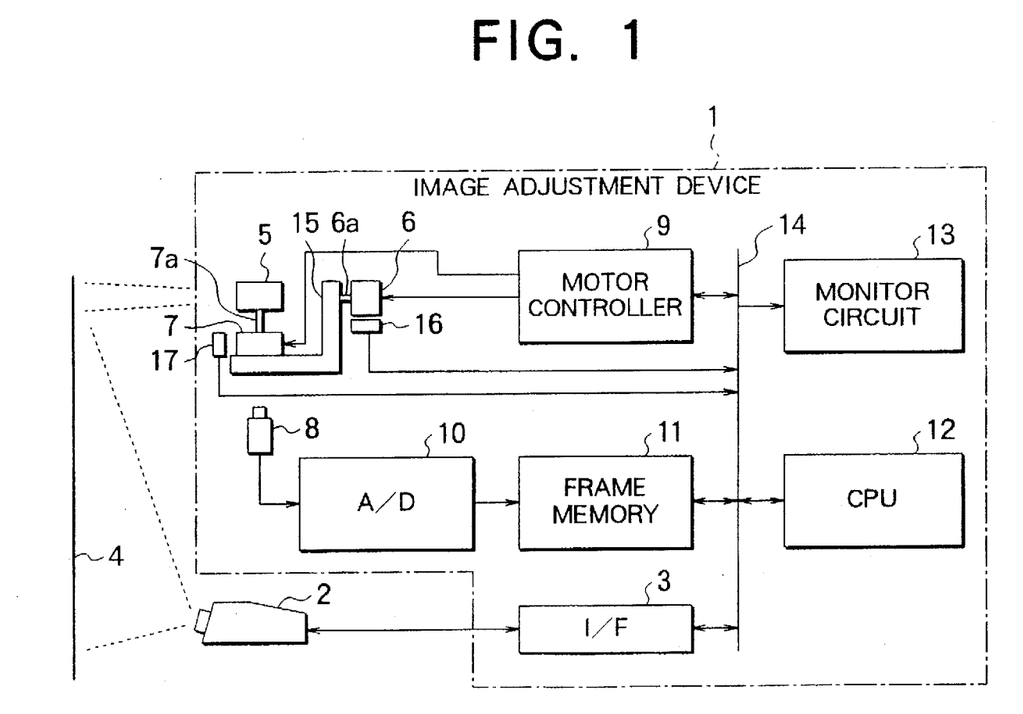
FIG. 1 is a block diagram showing the configuration of Embodiment 1 of the invention.

First, an embodiment in which the invention is applied to an automatic convergence adjustment device for a CRT-type video projector will be described. FIG. 1 is a block diagram showing the hardware construction of this embodiment (Embodiment 1). The part encircled by dotted line and denoted by reference numeral 1 is an image adjustment device. A video projector 2 is adjusted by the image adjustment device 1. An interface circuit 3 connects the video projector 2 with the rest of the image adjustment device 1. An image from the video projector 2 is projected onto a screen 4. A mirror 5 has two axes for rotation. Mirror rotation devices which may be in the form of stepping motors 6 and 7 are coupled to the mirror 5 for rotation about the axes of the mirror 5.

A camera 8 picks up an image of a part of the screen 4, via the mirror 5, to obtain a magnified image of such part. By changing the angle of the mirror 5, the area on the screen 4 which is imaged by the camera 8 can be moved or varied.. A motor controller 9 controls the stepping motors 6 and 7. A shaft 7a of the stepping motor 7 is directly coupled to the mirror 5, and the shaft 6a of the stepping motor 6 is directly coupled to a supporting member 15 on which the stepping motor 7 is mounted. An angle sensor 16 detects the rotational angle of the stepping motor 6, and hence the rotational angle of the supporting member 15 or of the mirror 5 about one of the axes of the mirror 5, which is coincident with the axis of the shaft 6a of the stepping motor 6. Another angle sensor 17 detects the rotational angle of the stepping motor 7, and hence the rotational angle of the mirror 5 about the other axis of the mirror 5, which is coincident with the axis of the shaft 7a of the stepping motor 7. An A/D converter 10 converts the video signal produced by the camera 8 into digital data. A frame memory 11 stores one frame of the digitized video signal data. A CPU 12 performs arithmetic operations and controls the rest of the entire device. The CPU 12 includes a work memory within it. A bus 14 is for connecting the CPU 12 with the interface circuit 3, the motor controller 9, the frame memory 11 and a monitor circuit 13.

Figure 2:
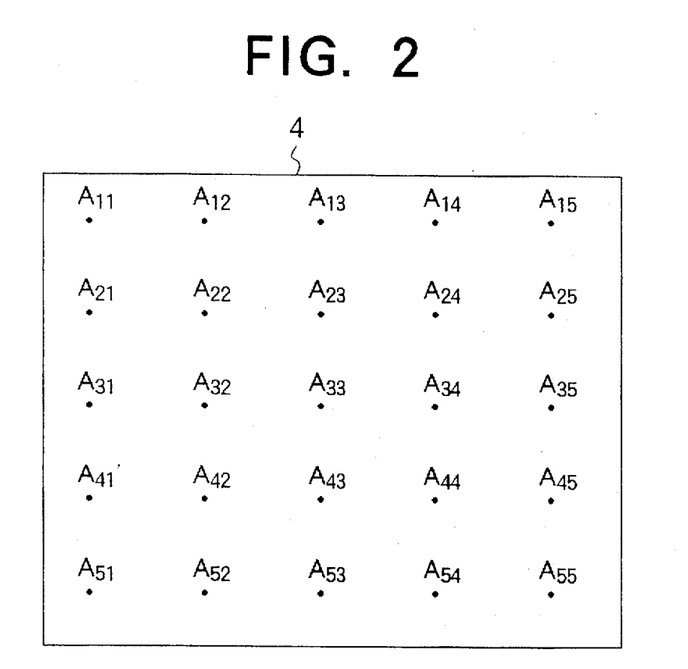
FIG. 2 shows the positions of adjustment points in Embodiment 1.

The operation for the convergence adjustment in Embodiment 1 will next be described. In Embodiment 1, it is assumed that the convergence adjustment is made at 5 (vertical direction) by 5 (horizontal direction) adjustment points in the projected image. FIG. 2 shows an example of 5×5=25 adjustment points $A_{11}$ to $A_{55}$ set on the screen. In this embodiment, the CPU 12 controls the motor controller 9 to rotate the stepping motors 6 and 7 and hence the mirror 5 to appropriate angles, so that the desired part on the screen can be imaged.

When the image adjustment device 1 is initially installed, the angles of the mirror 5 or of the stepping motors 6 and 7 for imaging the respective adjustment points are not known. The angles of the stepping motors 6 and 7 for imaging the respective adjustment points are automatically detected. This automatic detection is called "learning of the positions of the adjustment points." After the learning of the positions of the adjustment points, it is possible to automatically and successively image the respective adjustment points.

During convergence adjustment, the angles of the stepping motors 6 and 7 are successively set or varied by the CPU 12 so as to image the first adjustment point by means of the camera 8, and then convergence adjustment at each adjustment point is carried out in the same way as in the prior-art example. By repeating such an operation, the convergence adjustment is automatically performed for all the adjustment points, without manual input for designating the adjustment points.

The learning of the positions of the adjustment points according to Embodiment 1 will next be described in detail with reference to FIG. 3.

Figure 3:
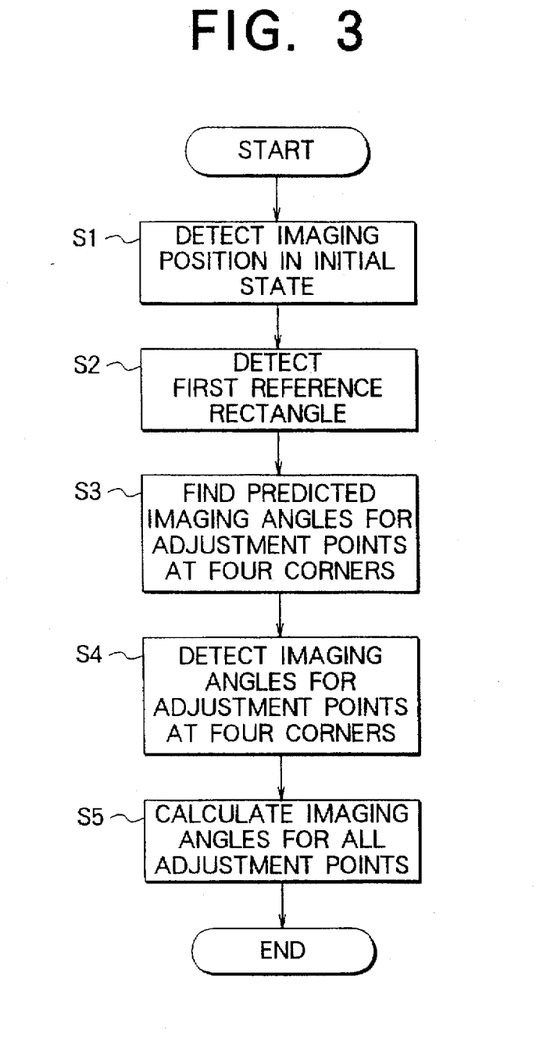
FIG. 3 is a flowchart showing operations in the learning of the position of adjustment point in Embodiment 1.

It is assumed that before starting the operation shown in the flowchart of FIG. 3, the orientation of the mirror 5 is so adjusted, by human observation and operation for instance, that the camera 8 images some part of the screen 4.

Figure 4A:
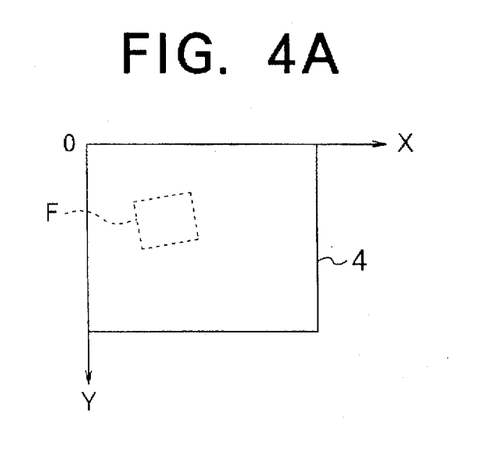
FIG. 4A to FIG. 4E illustrate the processing for obtaining the initial imaging position of the camera in Embodiment 1.

First, at step S1, in the initial state (the state when the image adjustment device 1 and the video projector 2 have been installed), the imaging position of the camera 8 (the position on the screen 4 which the camera 8 is imaging) is determined. This method of determination will next be described with reference to FIG. 4A to FIG. 4E. Referring first to FIG. 4A, a rectangle F, depicted by dotted line indicates the area forming a part of the screen 4, which is initially imaged by the camera 8. For the purpose of the below-described processing or arithmetic calculation, the positions on the screen 4 are expressed using an x-y coordinate, and the upper-left corner of the screen 4 is assumed to be the origin, and the x-axis is assumed to extend in the horizontal direction, with the coordinate value increasing toward the right, and the y-axis is assumed to extend vertically, with the coordinate value increasing downward. If there is no raster distortion, the video projector 2 can project an image on a desired position on the screen 4, expressed by a certain x-y coordinate. During operations for determining the position of the area being imaged is determined in the initial state, the stepping motors 6 and 7 are fixed, at the angles, which are denoted by $\theta_0$ and $\phi_0$, respectively, or by ($\theta_0$, $\phi_0$). Similar notation is used for expressing the pair of angles of the stepping motors 6 and 7.

For finding the imaging position in the initial state, the imaging position Y0 in the vertical direction, with the stepping motors 6 and 7 at ($\theta_0$, $\phi_0$), is determined or found. This is achieved by sending an instruction from the CPU 12 via the interface circuit 3 to the video projector 2, to project from the video projector 2 on the screen 4, a horizontal line LH whose y-coordinate value is at an arbitrary value Y1. This horizontal line LH is imaged by the camera 8. One frame of the video signal obtained by the imaging is converted into digital data by the A/D converter 10, and one frame of the digital data is stored in the frame memory 11 as a still image data. This sequence of operation (i.e., imaging by the camera 8, the conversion into the digital data at the A/D converter 10, and writing of the digital data in the frame memory 11) is called freeze imaging.

Figure 4B:
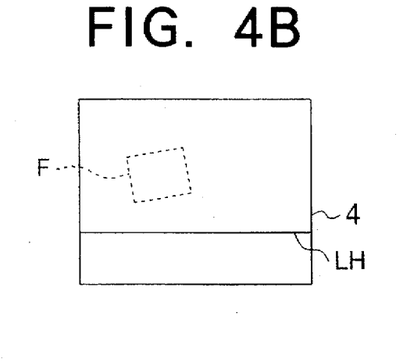
Figure 4C:
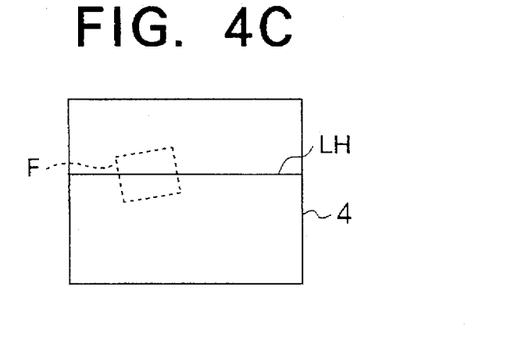

By judging, by means of the CPU 12, whether a pixel having a luminance level exceeding a certain threshold is present or not, it can be judged whether the horizontal line LH is in the imaged area F. FIG. 4B shows a situation in which the horizontal line LH is not within the imaged area F, while FIG. 4C shows a situation in which the horizontal line LH is within the imaged area F. When the horizontal line LH is within the imaged area F, as shown in FIG. 4C, Y1 is written as the vertical imaging position Y0 in the work memory in the CPU 12.

If the horizontal line LH is not within the imaged area F, as shown in FIG. 4B, the horizontal line LH is displayed at a different vertical position. In this state, the freeze imaging is again conducted, and judgment is made by means of the CPU 12 as to whether the horizontal line LH is within the imaged area F, using the data stored in the frame memory 11. The above operation is repeated until the horizontal line LH is found to be within the imaged area F, when the vertical imaging position Y0 is determined.

Figure 4D:
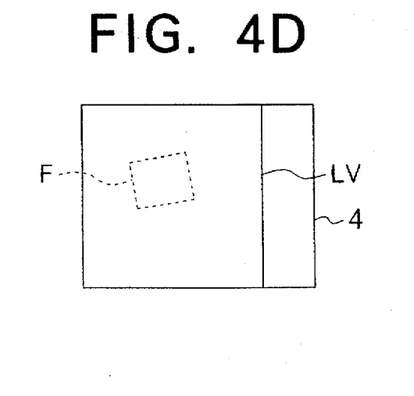
Figure 4E:
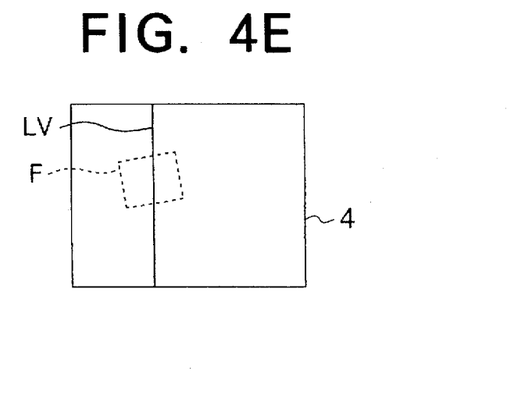

Similarly, the horizontal imaging position X0 is determined, using a vertical line LV, as shown in FIG. 4D and FIG. 4E. In this way, the imaging position (X0, Y0) of the camera 8 is determined.

Figure 5:
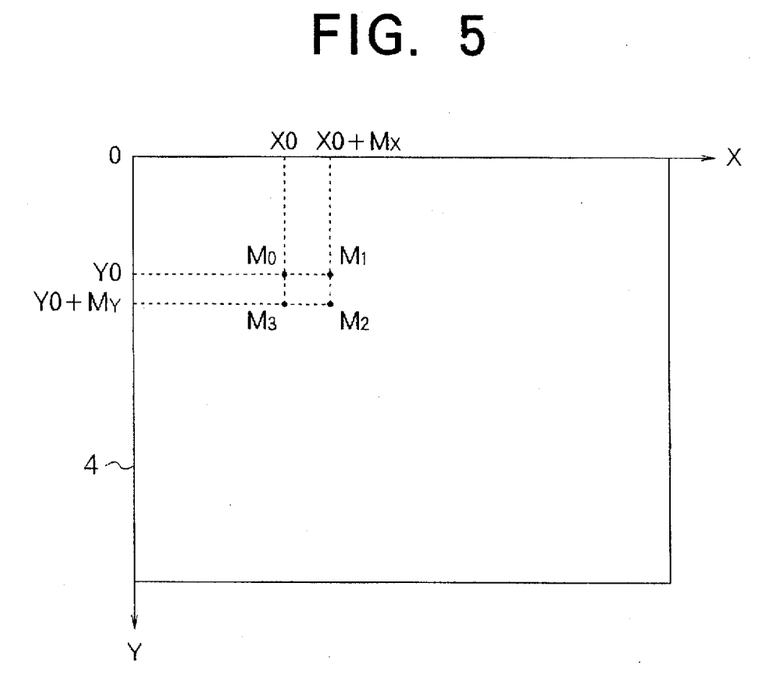
FIG. 5 shows the first reference rectangle in Embodiment 1.

Next, at step S2, the angles of the stepping motors 6 and 7 with which each of the vertices $M_0$, $M_1$, $M_2$ and $M_3$ is at the center of the imaged area F when the freeze imaging is performed are found, with one of the vertices $M_0$ being at the imaging position (X0, Y0) as obtained at the step S1, while the vertices $M_1$, $M_2$ and $M_3$ being the remaining vertices of a rectangle defined by the vertices $M_0$, $M_1$, $M_2$ and $M_3$. This method will then be explained. FIG. 5 shows the four vertices $M_0$, $M_1$, $M_2$ and $M_3$ on the screen 4. $M_0$ is assumed to be the upper-left vertex of a rectangle, and the lengths of the horizontal and vertical sides of the rectangle are assumed to be $M_x$ and $M_y$, respectively. Then, the coordinates of the vertices $M_1$, $M_2$ and $M_3$ are (X0+$M_x$, Y0), (X0+$M_x$, Y0+My), and (X0, Y0+$M_y$), respectively. $M_x$ and $M_y$ are sufficiently small compared with the size of the imaged area of the camera 8, and if $M_0$ is within the imaged area of the camera 8, $M_1$, $M_2$ and $M_3$ may also be within the same imaged area, or at such positions that they can be brought into the imaged area by changing the angles of the stepping motors 6 and 7 by a little amount, in a direction corresponding to the direction on the screen in which the next vertex being sought is expected to lie. It is to be noted if the distance between one vertex (e.g., $M_0$) and the next vertex (e.g., $M_1$) is short, the rotation of the stepping motors 6 and 7 in the direction corresponding to the direction on the screen (i.e., horizontal direction) in which the next vertex ($M_1$) is expected to lie will cause the next vertex ($M_1$) to be within the imaged area without fall, but if the distance between one vertex ($M_0$) and the next vertex ($M_1$) is long, the rotation of the stepping motors 6 and 7 in the direction corresponding to the direction on the screen (horizontal direction) in which the next vertex ($M_1$) is expected to lie will not necessarily cause the next vertex ($M_1$) to be within the imaged area because there is no exact correspondence between the direction of rotation of the mirror 5 and the direction in which the imaged area is moved on the screen 4, depending on various factors such as the orie image adjustment device 1 with respect to the screen 4, and non-linearity of the trajectory of (the center of) the imaged area with the variation of rotation of the mirror.

For finding the angles of the stepping motors 6 and 7 with which the vertex $M_0$ is at the center of the imaged area F, an adjustment pattern $P_{m0}$ (which may be a small rectangular dot) is first projected from the video projector 2 on the screen 4, at the position $M_0$ (X0, Y0). The adjustment pattern $P_{m0}$ is therefore within the imaged area as the angles of stepping motors 6 and 7 are unchanged from the final state in the step S1. By performing the freeze imaging, the coordinates (FX$_{m0}$, FY$_{m0}$) of the center of gravity of the adjustment pattern having been imaged is calculated by the CPU 12. Through fine adjustment of the angles of the stepping motors 6 and 7 until the center of gravity of $P_{m0}$ is at the center of the imaged area F, the imaging angles ($\theta_0$, $\phi_0$) for $M_0$ on the screen 4 can be obtained. That is, the imaging angles at the time when the center of gravity of $P_{m0}$ is at the center of the imaged area F are the imaging angles ($\theta_0$, $\phi_0$) for $M_0$. The thus-determined imaging angles ($\theta_0$, $\phi_0$) are written in the work memory in the CPU 12.

Next, an adjustment pattern $P_{m1}$ is projected from the video projector 2 on the screen 4, at a position of $M_1$ (X0+$M_x$, Y0). The angles of the stepping motors 6 and 7 are adjusted so as to move the imaging position of the camera 8 until the center of gravity of $P_{m1}$ comes to the center of the imaged area F. This is achieved in the following manner. If the adjustment pattern $P_{m1}$ is not within the imaged area, the angles of the stepping motors 6 and 7 are varied in a direction which is expected cause movement of the imaging position of the camera 8 in the positive direction on the X axis of the screen 4, until the adjustment pattern $P_{m1}$ is brought into the imaged area. Once the adjustment pattern $P_{m1}$ is brought into the imaged area (or if the adjustment pattern $P_{m1}$ is already in the imaged area without such variation of the angles of the stepping motors 6 and 7), the angles of the stepping motors 6 and 7 are so adjusted that the center of gravity of $P_{m1}$ is brought to the center of the imaged area F. The imaging angles at which the center of gravity of $P_{m1}$ is at the center of the imaged area are the imaging angles ($\theta_1$, $\phi_1$) for $M_1$, and are written as such in the work memory.

The imaging angles ($\theta$hd 2, $\phi_2$) and ($\theta_3$, $\phi_3$) for $M_2$ and $M_3$ are similarly obtained and written in the work memory. The imaging angles ($\theta_0$, $\phi_0$) to ($\theta_3$, $\phi_3$) for the respective vertices $M_0$ to $M_3$ are thus obtained.

Next, at the step S3, the CPU 12 calculates the imaging angles $A_{11}$, $A_{15}$, $A_{55}$ and $A_{51}$ at the four points at four corners of the raster, among the adjustment points, on the basis of the imaging angles for the vertices $M_0$, $M_1$, $M_2$ and $M_3$ of the rectangle. If four arbitrary points on the screen are at vertices of a rectangle, and the imaging angles for these points are known, an arbitrary point K on the plane (i.e., the screen 4) including this rectangle can be determined by calculation. This method of calculation is hereinafter referred to as "reference position determining method."

Figure 6:
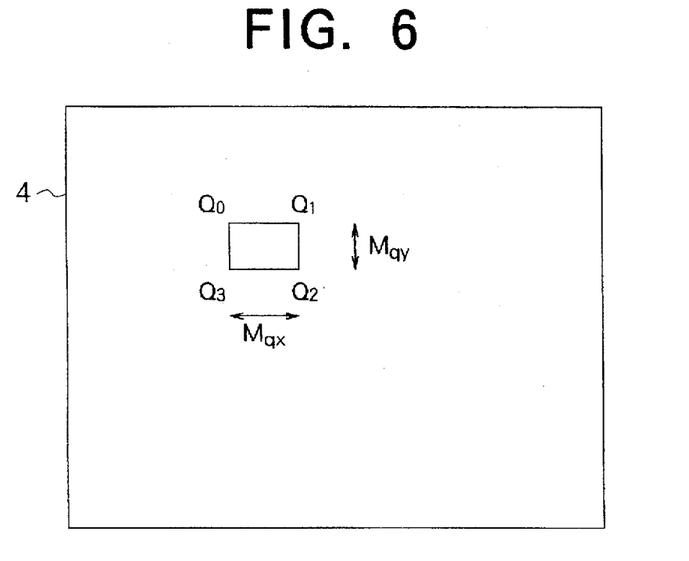
FIG. 6 illustrates the reference position determination method, taking a reference rectangle on the screen in Embodiment 1 as an example.

The reference position determining method will next be described. As shown in FIG. 6, it is assumed that adjustment points $Q_0$, $Q_1$, $Q_2$ and $Q_3$ are provided to form a rectangle (hereinafter referred to as "reference rectangle") on the screen 4, the length of the side $Q_0Q_1$ or the side $Q_2Q_3$ is $M_{qx}$, and the length of the side $Q_1Q_2$ or the side $Q_3Q_0$ is $M_{qy}$. The imaging angles for the four points $Q_0$, $Q_1$, $Q_2$ and $Q_3$ are assumed to be $(\theta_{q0}, \phi_{q0})$, $(\theta_{q1}, \phi_{q1})$, $(\theta_{q2}, \phi_{q2})$ and $(\theta_{q3}, \phi_{q3})$.

Figure 7:
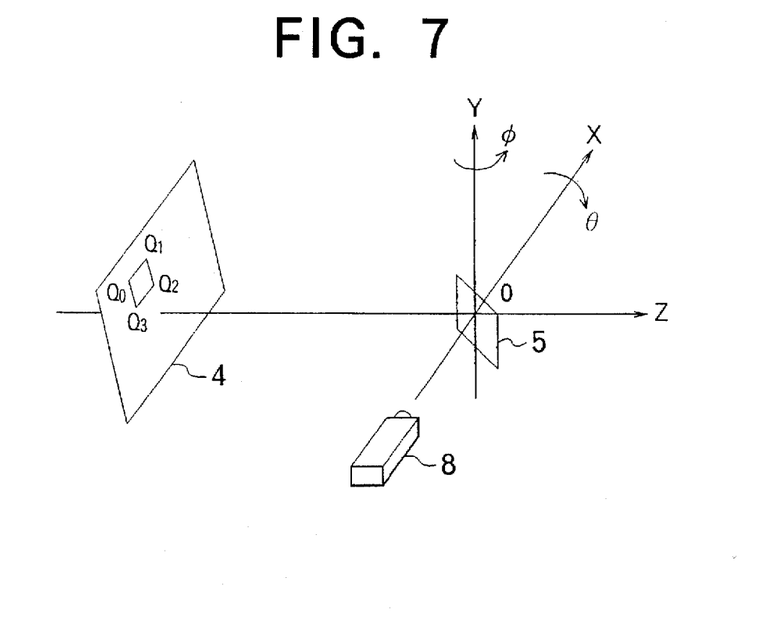
FIG. 7 illustrates the reference position determination method, showing the definition of the three-dimensional coordinate system in Embodiment 1.

FIG. 7 shows the positional relationship between the screen 4, the mirror 5 and the camera 8. The three-dimensional coordinate space illustrated in the figure is defined as follows. The position at which the mirror 5 is placed and through which both of the axes of rotations of the mirror 5 extend is assumed to be the origin O. If the mirror 5 is within the XY plane, the angle $\theta$ of the the stepping motor 6 is assumed to be 0, and the angle $\phi$ of the the stepping motor 7 is assumed to be 0. The direction from the origin O toward the screen 4 is assumed to be the negative direction of the Z axis. Also, the direction from the origin O toward the position where the camera 8 is placed is assumed to be the negative direction of the X axis. The axis of rotation of the stepping motor 6 is always in coincident with the X axis. The orientation of the axis of rotation of the stepping motor 7 depends on the angle $\theta$ of the stepping motor 6, and is coincident with the Y axis when $\theta=0$. When the angles of the stepping motors 6 and 7 are $(\theta, \phi)$, the direction of the normal vector is coincident with a vector obtained by rotating a vector extending in the direction of the negative direction of the Z axis, by an angle $\phi$ about the Y axis in the clockwise direction as seen toward the positive direction of the Y-axis, and then rotating the resultant vector about the X axis by an angle $\theta$ in the clockwise direction as seen toward the positive direction of the X axis.

Next, the relationship between the directional vector $(x_k, y_k, z_k)$ originating from the origin O, of an arbitrary point K on the screen 4, and the angles $(\theta_K, \phi_K)$ of the stepping motors 6 and 7 is described. When the angles $(\theta_K, \phi_K)$ of the stepping motors 6 and 7 are known, the directional vector $(x_k, y_k, z_k)$ is determined by the following formulae (1) to (3):

$$x_k = \cos 2\phi_K \quad (1)$$

$$x_k = \sin \theta_K \sin 2\phi_K \quad (2)$$

$$z_k = -\cos \theta_K \sin 2\phi_K \quad (3)$$

Conversely, when the directional vector $(x_k, y_k, z_k)$ is known, the angles $(\theta_K, \phi_K)$ can be determined by the following formulae (4) and (5):

$$\theta_K = \cos^{-1}\{z_k/(y_k^2+z_k^2)^{0.5}\} \quad (4)$$

$$\phi_K = \tfrac{1}{2}\cos^{-1}\{x_k/(x_k/(x_k^2+y_k^2+z_k^2)^{0.5})\} \quad (5)$$

Figure 8:
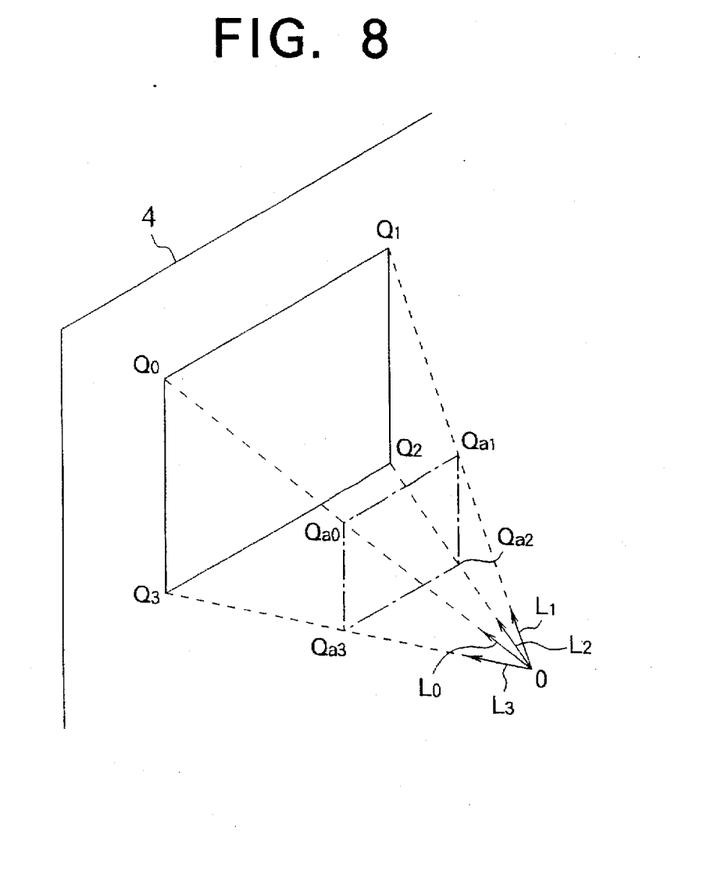
FIG. 8 illustrates the reference position determination method, showing a reference rectangle on the screen and the vectors pointing in the direction of the vertices in Embodiment 1.

Next, the method of determining the imaging angles $(\theta_K, \phi_K)$ of an arbitrary point K, from the imaging angles $(\theta_{q0}, \phi 0)$ to $(\theta_{q3}, \phi 3)$ for the respective vertices $Q_0$ to $Q_3$ of the reference rectangle will be described. FIG. 8 shows the vertices $Q_0$ to $Q_3$ of the reference rectangle and the directional vector originating from the origin O. $L_0$, $L_1$, $L_2$ and $L_3$ denote the unit vectors having the directions originating from the origin O and extending in the directions toward $Q_0$, $Q_1$, $Q_2$ and $Q_3$.

By substituting $(\theta_0, \phi_0)$ for $(\theta_K, \phi_K)$ in the formulae (1) to (3), the unit vector $L_0=(L_{0x}, L_{0y}, L_{0z})$ toward $Q_0$ is determined. Similarly, the unit vectors $L_1=(L_{1x}, L_{1y}, L_{1z})$, $L_2=(L_{2x}, L_{2y}, L_{2z})$ and $L_3=(L_{3x}, L_{3y}, L_{3z})$ toward $Q_1$, $Q_2$ and $Q_3$ are determined.

$Q_{a0}=(Q_{a0x}, Q_{a0y}, Q_{a0z})$ in FIG. 8 is a point having the same directional vector $L_0$ as $Q_0$. That is, $Q_{a0}$ is on the line connecting $Q_0$ and the origin O, and the imaging angle for $Q_{a0}$ is equal to the imaging angle for $Q_0$. Similarly, $Q_{a1}=(Q_{a1x}, Q_{a1y}, Q_{a1z})$, $Q_{a2}=(Q_{a2x}, Q_{a2y}, Q_{a2z}$ and $Q_{a3}=(Q_{a3x}, Q_{a3y}, Q_{a3z})$ are points having unit vectors $L_1$, $L_2$ and $L_3$ in the directions common with $Q_1$, $Q_2$ and $Q_3$.

The coordinates of $Q_{a0}$, $Q_{a1}$, $Q_{a2}$ and $Q_{a3}$ are obtained from $L_0$, $L_1$, $L_2$ and $L_3$ so that the following Condition 1 is satisfied.

Condition 1: $Q_{a0}$, $Q_{a1}$, $Q_{a2}$ and $Q_{a3}$ are on the same plane, and the quadrilateral $Q_{a0}Q_{a1}Q_{a2}Q_{a3}$ is a parallelepiped.

There are infinite number of of solutions which satisfy Condition 1, but by appropriately determining $Q_{a0z}$, for instance, a single solution can be determined unequivocally. For each of the components $Q_{a0}$, $Q_{a1}$, $Q_{a2}$, $Q_{a3}$, $L_0$, $L_1$, $L_2$ and $L_3$, the following formulae hold:

$$Q_{a0x}=Q_{a0z} \cdot L_{0x}/L_{0z} \quad (6)$$

$$Q_{a0y}=Q_{a0z} \cdot L_{0y}/L_{0z} \quad (7)$$

$$Q_{a1x}=Q_{a1z} \cdot L_{1x}/L_{1z} \quad (8)$$

$$Q_{a1y}=Q_{a1z} \cdot L_{1y}/L_{1z} \quad (9)$$

$$Q_{a2x}=Q_{a2z} \cdot L_{2x}/L_{2z} \quad (10)$$

$$Q_{a2y}=Q_{a2z} \cdot L_{2y}/L_{2z} \quad (11)$$

$$Q_{a3x}=Q_{a3z} \cdot L_{3x}/L_{3z} \quad (12)$$

$$Q_{a3y}=Q_{a3z} \cdot L_{3y}/L_{3z} \quad (13)$$

If $Q_{a0z}$ is appropriately determined, $Q_{a1z}$, $Q_{a2z}$, $Q_{a3z}$ will be solutions of the following simultaneous equations of L-th degree, (14) to (18):

$$Q_{a1z} \cdot L_{1x}/L_{1z} - Q_{a2z} \cdot L_{2x}/L_{2z} + Q_{a3z} \cdot L_{3x}/L_{3z} = Q_{a0z} \cdot L_{0x}/L_{0z} \quad (14)$$

$$Q_{a1z} \cdot L_{1y}/L_{1z} - Q_{a2z} \cdot L_{2y}/L_{2z} + Q_{a3z} \cdot L_{3y}/L_{3z} = Q_{a0z} \cdot L_{0y}/L_{0z} \quad (15)$$

$$Q_{a1z} - Q_{a2z} + Q_{a3z} = Q_{a0z} \quad (16)$$

By substituting $Q_{a0z}$, $Q_{a1z}$, $Q_{a2z}$, and $Q_{a3z}$ obtained from the formulae (14) to (16), in formulae (6) to (13), $Q_{a0x}$, $Q_{a1x}$, $Q_{a2x}$, $Q_{a3x}$, $Q_{a0y}$, $Q_{a1y}$, $Q_{a2y}$, and $Q_{a3y}$ can be obtained. In this way, the coordinates of $Q_{a0}$, $Q_{a1}$, $Q_{a2}$ and $Q_{a3}$ satisfying Condition 1 can be determined. The plane containing $Q_{a0}$, $Q_{a1}$, $Q_{a2}$ and $Q_{a3}$ thus determined is referred to as plane T. The plane T is parallel with the screen.

It is assumed that an arbitrary point K on the screen is expressed as the following formula (17) using coefficients $a_0$ to $a_3$ (which are determined in a manner described later) and $Q_0$ to $Q_3$.

$$\overrightarrow{OK} = a_0 \cdot \overrightarrow{OQ_0} + a_1 \cdot \overrightarrow{OQ_1} + a_2 \cdot \overrightarrow{OQ_2} + a_3 \cdot \overrightarrow{OQ_3} \quad (17)$$

Figure 9:
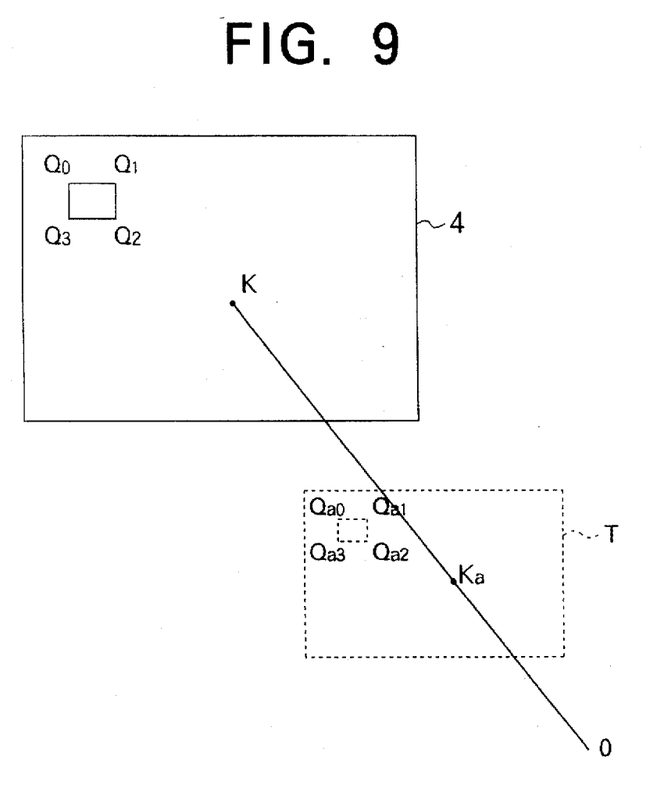
FIG. 9 illustrates the reference position determination method, indicating the method of calculating the coordinates of a reference position in Embodiment 1.

If the intersection of the line connecting the point K and the origin O, and the plane T is denoted by $K_a$, as shown in FIG. 9, the following equation (18) holds:

$$\overrightarrow{OK_a} = a_0 \cdot \overrightarrow{OQ_{a0}} + a_1 \cdot \overrightarrow{OQ_{a1}} + a_2 \cdot \overrightarrow{OQ_{a2}} + a_3 \cdot \overrightarrow{OQ_{a3}} \quad (18)$$

The respective components of the vectors $\vec{OQ}_{a0}$ to $\vec{OQ}_{a3}$ are equal to the coordinates of the points $Q_{a0}$ to $Q_{a3}$ which are earlier determined, so that the respective components $(x_{ka}, y_{ka}, z_{ka})$ of the vector $\vec{OK}_a$ can be determined from formula (18). The imaging angles of the points K and $K_a$ are equal, so that the imaging angles $(\theta_K, \phi_K)$ for the point K can be determined according to formulae (4) and (5).

The coefficients $a_0$ to $a_3$ are determined in the following manner.

If the point K is represented by coordinate values (x, y) on the screen, and the point $Q_0$, $Q_1$, $Q_2$ and $Q_3$ are represented by coordinate values (x0, y0), (x1, y1), (x2, y2) and (x3, y3), then $\vec{OK}$ can be expressed by the following equation:

$$\begin{aligned}\vec{OK} &= \vec{OQ}_0 + (\vec{OQ}_1 - \vec{OQ}_0)\cdot(x-x0)/(x1-x0) + \\ &\quad (\vec{OQ}_3 - \vec{OQ}_0)\cdot(y-y0)/(y3-y0) \\ &= \{1 - (x-x0)/(x1-x0) - (y-y0)/(y3-y0)\}\cdot\vec{OQ}_0 + \\ &\quad (x-x0)/(x1-x0)\cdot\vec{OQ}_1 + 0\cdot\vec{OQ}_2 + \\ &\quad (y-y0)/(y3-y0)\cdot\vec{OQ}_3\end{aligned}$$

Comparing the above equation with the formula (17), $a_0 = \{1 - (x-x0)/(x1-x0) - (y-y0)/(y3-y0)\}$
$a_1 = (x-x0)/(x1-x0)$
$a_2 = 0$
$a_3 = (y-y0)/(y3-y0)$ $\vec{OK}$ can also be expressed by the following equation:

$$\begin{aligned}\vec{OK} &= \vec{OQ}_1 + (\vec{OQ}_0 - \vec{OQ}_1)\cdot(x-x1)/(x0-x1) + \\ &\quad (\vec{OQ}_2 - \vec{OQ}_1)\cdot(y-y1)/(y2-y1) \\ &= (x-x1)/(x0-x1)\cdot\vec{OQ}_0 + \\ &\quad \{1 + (x-x1)/(x0-x1) - (y-y1)/(y2-y1)\}\cdot\vec{OQ}_1 + \\ &\quad (y-y1)/(y2-y1)\cdot\vec{OQ}_2 + 0\cdot\vec{OQ}_3\end{aligned}$$

Comparing the above equation with the formula (17), $a_0 = (x-x1)/(x0-x1)$
$a_1 = \{1 - (x-x1)/(x0-x1) - (y-y1)/(y2-y1)\}$
$a_2 = (y-y1)/(y2-y1)$
$a_3 = 0$ $\vec{OK}$ can also be expressed by the following equation:

$$\begin{aligned}\vec{OK} &= \vec{OQ}_2 + (\vec{OQ}_3 - \vec{OQ}_2)\cdot(x-x2)/(x3-x2) + \\ &\quad (\vec{OQ}_1 - \vec{OQ}_2)\cdot(y-y2)/(y1-y2) \\ &= 0\cdot\vec{OQ}_0 + \\ &\quad (y-y2)/(y1-y2)\cdot\vec{OQ}_1 + \\ &\quad \{1 - (x-x2)/(x3-x2) - (y-y2)/(y1-y2)\}\cdot\vec{OQ}_2 + \\ &\quad (x-x2)/(x3-x2)\cdot\vec{OQ}_3\end{aligned}$$

Comparing the above equation with the formula (17), $a_0 = 0$
$a_1 = (y-y2)/(y1-y2)$
$a_2 = \{1 - (x-x2)/(x3-x2) - (y-y2)/(y1-y2)\}$
$a_3 = (x-x2)/(x3-x2)$ $\vec{OK}$ can also be expressed by the following equation:

$$\begin{aligned}\vec{OK} &= \vec{OQ}_3 + (\vec{OQ}_2 - \vec{OQ}_3)\cdot(x-x3)/(x2-x3) + \\ &\quad (\vec{OQ}_0 - \vec{OQ}_3)\cdot(y-y3)/(y0-y3) \\ &= (y-y3)/(y0-y3)\cdot\vec{OQ}_0 + 0\cdot\vec{OQ}_1 + \\ &\quad (x-x3)/(x2-x3)\cdot\vec{OQ}_2 + \\ &\quad \{1 - (x-x3)/(x2-x3) - (y-y3)/(y0-y3)\}\cdot\vec{OQ}_3\end{aligned}$$

Comparing the above equation with the formula (17), $a_0 = (y-y3)/(y0-y3)$
$a_1 = 0$
$a_2 = (x-x3)/(x2-x3)$
$a_3 = \{1 - (x-x3)/(x2-x3) - (y-y3)/(y0-y3)\}$ Thus, depending on which of the points $Q_0$, $Q_1$, $Q_2$, $Q_3$ is taken as a reference, the coefficients $a_0$ to $a_3$ are given by different formulae. However, the resultant value of $\vec{OK}$ is identical whichever set of the coefficients are used. The four sets of the coefficients can be selectively used, depending on the position of the point K, or only one of the four sets may be used for any point. In practice, the point K is taken such that each of the ratios, such as (x−x0)/(x1−x0), is a rational number (given by a ratio between integers), so that by appropriate selection among the sets of the coefficients, the amount of calculation involved can be minimized. The formulae (17) is given as a general formula, but one of the coefficients is zero.

As has been described, the imaging angles $(\theta_K, \phi_K)$ for the point K on the screen 4 can be determined through calculation, on the basis of the imaging angles for the respective vertices of the reference rectangle $Q_0Q_1Q_2Q_3$ on the screen 4.

By using the above reference position determining method, the imaging angles $(\theta_{a11}, \phi_{a11})$, $(\theta'_{a15}, \phi'_{a15})$, $(\theta'_{a55}, \phi'_{a55})$, $(\theta_{a51}, \phi_{a51})$ for the adjustment points $A_{11}$, $A_{15}$, $A_{55}$, $A_{51}$ can be determined. The calculated imaging angles may be offset from the actual or true imaging angle $(\theta_{a11}, \phi_{a11})$, $(\theta_{a15}, \phi_{a15})$, $(\theta_{a55}, \theta_{a55})$, $(\theta_{a51}, \phi_{a51})$ for the adjustment points $A_{11}$, $A_{15}$, $A_{55}$, $A_{51}$ due to the stationary angular errors of the stepping motors 6 and 7, or the raster distortion. The imaging angles determined by calculation will be called calculated or predicted imaging angles, for distinction from the true imaging angles.

Next, in the step S4, the true imaging angles $(\theta_{a11}, \phi_{a11})$, $(\theta_{a15}, \phi_{a15})$, $(\theta_{a55}, \phi_{a55})$, and $(\theta_{a51}, \phi_{a51})$ are obtained on the basis of the predicted imaging angles $(\theta'_{a11}, \phi'_{a11})$, $(\theta'_{a15}, \phi'_{a15})$, $(\theta'_{a55}, \phi'_{a55})$, and $(\theta'_{a51}, \phi'_{a51})$. The processing is detailed below, taking the position of adjustment point $A_{11}$ as an example.

The stepping motors 6 and 7 are set to the predicted imaging angles $(\theta'_{a11}, \phi'_{a11})$ for $A_{11}$, which have been obtained by calculations in the step S3. The video projector 2 is made to project the adjustment pattern $P_{a11}$ at $A_{11}$ onto the screen 4. Then, the freeze imaging by means of the camera 8 is performed. Then, the calculation of the center of gravity is performed by means of the CPU 12 on the image data on the frame memory 11 to obtain the coordinates $(X_{a11}, Y_{a11})$ of the position of the center of gravity of the adjustment pattern $P_{a11}$ on the screen 4. The angles of the stepping motors are finely adjusted so as to bring Pall to the center of imaged area, and the resultant angles are assumed to be $(\theta_{a11}, \phi_{a11})$. The same processing is performed for the positions of adjustment points $A_{15}$, $A_{55}$, and $A_{51}$. In this way, the imaging angles $(\theta_{a11}, \phi_{a11})$, $(\theta_{a15}, \phi_{a15})$, $(\theta_{a55}, \phi_{a55})$, and $(\theta_{a51}, \phi_{a51})$ for the positions of adjustment points $A_{11}$, $A_{15}$, $A_{55}$, and $A_{51}$ are determined.

Next, in the step S5, the predicted imaging angles for positions of all adjustment points are determined by calculation. The adjustment points $A_{11}$, $A_{15}$, $A_{55}$, and $A_{51}$ for which the imaging angles are obtained in the step S4 are at the vertices of a rectangle on the screen 4. Accordingly, by adopting the reference position determination method, using the rectangle $A_{11}A_{15}A_{55}A_{51}$ as a reference rectangle, the imaging angles are calculated for each of the 5×5=25 positions of adjustment points $A_{11}$ to $A_{55}$ except $A_{11}$, $A_{15}$, $A_{55}$, and $A_{51}$, that is twenty-one positions of adjustment points. The calculated imaging angles are saved in the work memory. Now, the angles of the stepping motors 6 and 7 that allow the camera 8 to image all positions of adjustment points are obtained.

It is also possible to determine by calculation the predicted imaging angles of all the twenty-five positions of adjustment points $A_{11}$ to $A_{55}$, using the rectangle $M_0M_1M_2M_3$ as a reference rectangle. When this is attempted, however, the influence of the stationary angular error of the stepping motors 6 and 7 or of raster distortion is greater, that when the rectangle $A_{11}A_{15}A_{55}A_{51}$ is used. Accordingly, the difference between the predicted imaging angle and true imaging angle is large, and the test pattern may not be in the central part of the imaged area, so that the convergence adjustment will be difficult.

The learning of the positions of adjustment points described above enables the camera 8 to automatically image each of the 5×5=25 positions of adjustment points on the screen 4, allowing convergence adjustment to be executed automatically.

Embodiment 2

Figure 10:
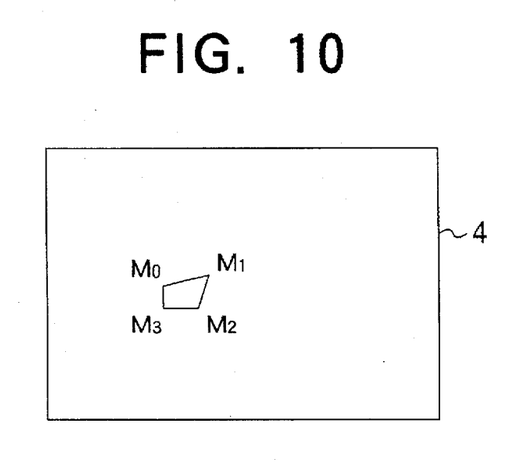
FIG. 10 shows an example of local raster distortion.

A problem with Embodiment 1 is that when the stepping motors 6 and 7 have a large stationary angular error or when there is a large local image distortion near the first reference rectangle $M_0M_1M_2M_3$ as shown in FIG. 10, the predicted imaging angles for the four positions of adjustment points $A_{11}$, $A_{15}$, $A_{55}$, and $A_{51}$ at the corners are largely different from the true imaging angles, and the positions of adjustment points $A_{11}$, $A_{15}$, $A_{55}$, and $A_{51}$ may not be captured in the imaged area of the camera 8 in the step S4. Embodiment 2 is configured to make it possible that the positions of four adjustment points at the corners are correctly captured within the imaged area of the camera 8 even in those cases. In Embodiment 2, the predicted imaging angles for the positions of four adjustment points $A_{11}$, $A_{15}$, $A_{55}$, and $A_{51}$ at the corners are not directly calculated from the first reference rectangle $M_0M_1M_2M_3$ but are detected on a step-by-step basis.

Figure 11:
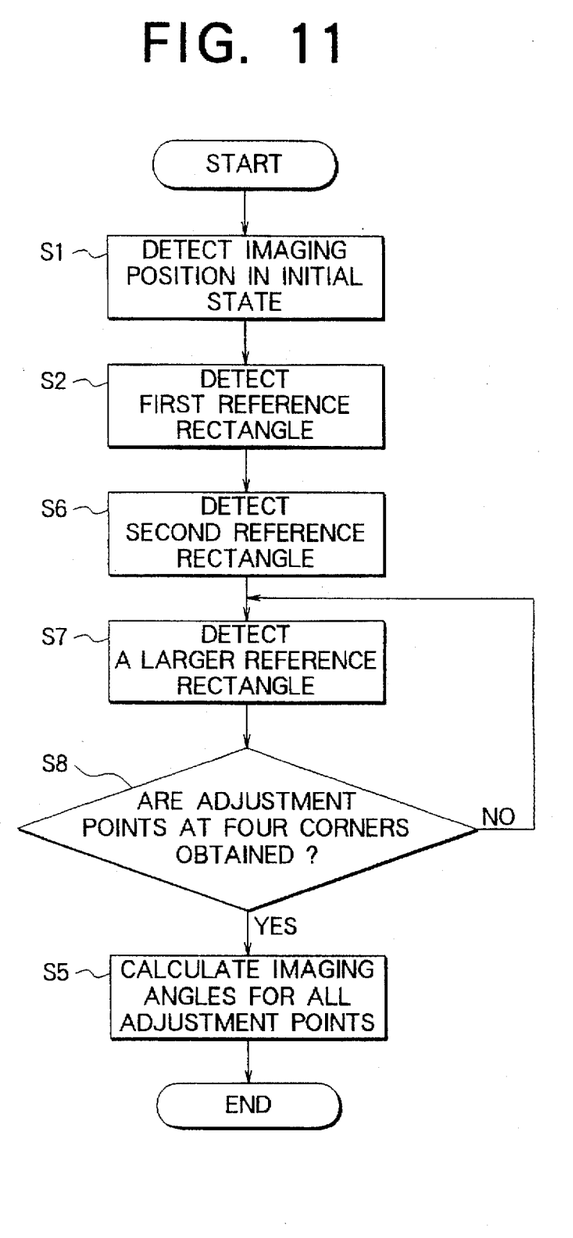
FIG. 11 is a flowchart showing the operations in the learning of the positions of adjustment points in Embodiment 2 of the invention.

FIG. 11 is a flowchart showing the learning of the position of adjustment point in Embodiment 2. The steps S1 and S2 are the same as in Embodiment 1. The first reference rectangle $M_0M_1M_2M_3$ obtained in the step S2 is called reference rectangle $R_1$.

Next, in the step S6, the imaging angles for the vertices of a second reference rectangle $R_2$, which is larger than the first reference rectangle $R_1$, are determined on the basis of the imaging angles for the vertices of $R_1$. The reference rectangle $R_2$ should be specified to satisfy the following conditions 11 and 12:

Condition 11: One vertex of $R_2$ is at the position of an adjustment point closest to the initial imaging position (X0, Y0).

Condition 12: The vertices of $R_2$ are at positions of adjustment points next to each other.

Figure 12:
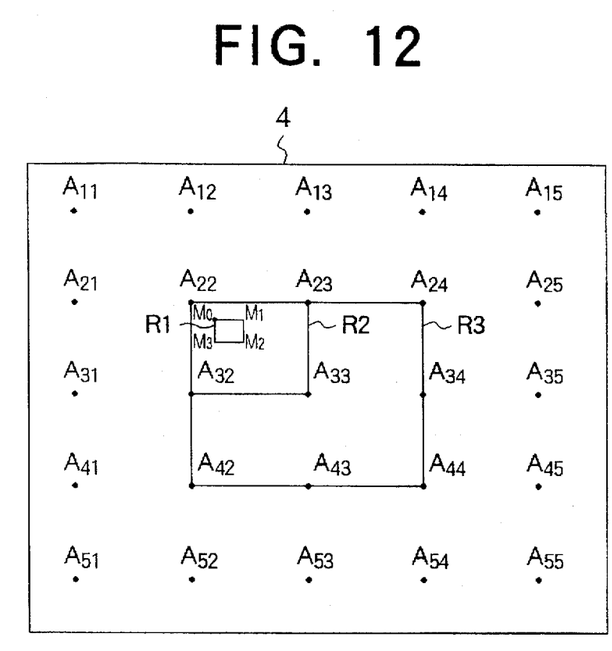
FIG. 12 illustrates a method of selecting a second reference rectangle $R_2$ in Embodiment 2.

FIG. 12 shows an example of relationship between the first reference rectangle $R_1$, second reference rectangle $R_2$, and third reference rectangle $R_3$ (to be explained later) on the screen 4. In this figure, the four vertices of the reference rectangle $R_2$ are at the positions of adjustment points $A_{22}$, $A_{23}$, $A_{33}$, and $A_{32}$. After these four vertices of $R_2$ are determined, the imaging angles for the respective vertices are obtained. The imaging angles for $A_{22}$, $A_{23}$, $A_{33}$, and $A_{32}$ are calculated in the same way as the imaging angles of $A_{11}$, $A_{15}$, $A_{55}$, and $A_{51}$ are calculated from $M_0M_1M_2M_3$ in Embodiment 1.

Next, in the step S7, the imaging angles for the vertices of the reference rectangle $R_3$ ($A_{22}$, $A_{24}$, $A_{44}$, and $A_{42}$, in the example shown in FIG. 12), which is larger than $R_2$, are determined in a similar manner. For example, the reference rectangle $R_3$ should be specified to satisfy the following conditions 21 and 22:

Condition 21: One vertex of $R_3$ is at the position of one of the vertices of $R_2$.

Condition 22: The distance between vertices adjacent to each other and aligned in the horizontal direction is twice the distance between adjustment points adjacent to each other and aligned in the horizontal direction, and the distance between vertices adjacent to each other and aligned in the vertical direction is twice the distance between adjustment points adjacent to each other and aligned in the vertical direction.

Processing similar to the processing described above is repeated until the imaging angles for the vertices of the largest reference rectangle $A_{11}A_{15}A_{55}A_{51}$ are obtained (the step S8). In this way, the imaging angles for the positions of adjustment points $A_{11}$, $A_{15}$, $A_{55}$, and $A_{51}$ at the corners are obtained. The subsequent processing (the step S5) is the same as in Embodiment 1.

The learning of the positions of adjustment points described above enables the camera 8 to automatically image the positions of 5×5=25 adjustment points on the screen 4, allowing convergence adjustment to be executed automatically, even when the stepping motors 6 and 7 have a large stationary angular error or when there is a large local image distortion near the first reference rectangle $M_0M_1M_2M_3$.

In the embodiments described above, imaging angles of the stepping motors or the mirror were determined and adjusted. The invention is applicable to any other situation, where driving positions in any other form are adjusted to vary the area to be imaged.

In the embodiment described, the imaging angle is varied until the center of gravity of the adjustment pattern is at the center of the imaged area. This however is not a limitation. It may alternatively be so arranged, that a certain specific part of the adjustment pattern (which may be other than the center of gravity) is at a certain specific part (which may be other than the center) of the imaged area.

The invention has been described in particular connection with convergence adjustment, but the invention is applicable to other adjustment, such as correction of raster distortion, as well as correction of non-uniformity of brightness or color between respective adjustment points, or correction of focusing error at respective points of the screen.

As described above, according to the present invention, the driving positions which need to be assumed for imaging areas respectively containing adjustment points can be calculated from the driving positions for the vertices of a rectangle on the screen, and test patterns displayed at all adjustment points can be automatically imaged in succession. So, no human intervention is needed in specifying the positions of the adjustment points, and the display positions, display states, and the like of test patterns can be automatically detected.

Furthermore, when the driving positions for the adjustment points at the corners of the screen are determined on the step-by-step basis, the determination of the driving positions can be performed properly even if there is a considerable stationary angular errors of the stepping motors or the like, or there is a local image distortion.

What is claimed is:

1. An automatic image adjustment device connected with an image display device for displaying an image on a screen, and used for various set-up adjustments such as the position and state of display of a test pattern displayed on the screen, through control over the image display device, said automatic image adjustment device comprising:

an imaging means for imaging an area forming a part of the screen;

an imaging position control means for controlling a position of said area in the screen;

an imaging position calculating means for calculating a driving position for imaging an arbitrary area on the screen, from driving positions of the imaging means for imaging areas respectively containing vertices of a rectangle on the screen.

2. An automatic image adjustment device according to claim 1, wherein the operation in which said imaging position calculation means calculates, from the driving positions of the imaging means for imaging areas respectively containing the vertices of the first-mentioned rectangle, driving positions for imaging areas respectively containing vertices of a second rectangle larger than said first-mentioned rectangle on the screen, and said imaging means images areas respectively containing the vertices of the second rectangle on the basis of said result of the calculation;

is repeated to determine driving positions for imaging areas respectively containing adjustment points at four corners of the screen.

3. An automatic image adjustment device connected with an image display device for displaying an image on a screen, and used for various set-up adjustments such as the position and state of display of a test pattern displayed on the screen, through control over the image display device, said automatic image adjustment device comprising:

an imaging means for imaging an area forming a part of the screen;

an imaging position control means for controlling a position of said area in the screen;

a processing means for determining a representation of a driving position of the imaging means in a state in which the imaging means is imaging an arbitrary area on the screen, determining driving positions for imaging areas containing vertices of a relatively small rectangle;

and determining driving positions for all adjustment points based on the driving positions for the vertices of the relatively small rectangle.

4. An automatic image adjustment device according to claim 3, wherein said processing means further causes display of a test pattern at each of the adjustment points determined by said processing means, and causes adjustment to be performed.

5. An automatic image adjustment device according to claim 3, wherein said relatively small rectangle is small enough so that it is possible to bring each of its vertices within an imaged area by varying the driving positions in a direction corresponding to the direction on the screen in which each of the vertices lies.

6. An automatic image adjustment device according to claim 3, wherein said determination of the representation of the driving position is performed by causing the image display device to display a predetermined pattern at a known part of the screen, and judging, from data obtained by the imaging means, whether the displayed predetermined pattern is within the area being imaged, if the displayed predetermined pattern is not within the imaged area, varying the position of the display of the predetermined pattern until the displayed pattern in within the area being imaged to find said representation of the driving position.

7. An automatic image adjustment device according to claim 3, wherein said determination of the driving positions for imaging areas containing vertices of said relatively small rectangle is performed by calculation on the basis of said result of determination of said representation.

8. An automatic image adjustment device according to claim 7, wherein said calculation on the basis of said result of determination of said representation is followed by displaying an adjustment pattern at each of the vertices, and adjusting the driving position so that a specific part of the adjustment pattern is at a specific part within the imaged area.

9. An automatic image adjustment device according to claim 3, wherein said determination of the driving positions for all adjustment points is performed by calculation on the basis of the driving positions for the vertices of the relatively small rectangle.

10. An automatic image adjustment device according to claim 3, wherein said determination of the driving positions for all adjustment points is performed by first determining driving positions for four adjustment points at corners of the screen, adjusting the driving positions for the adjustment points at the four corners of the screen, by displaying an adjustment pattern with the calculated driving position, and varying the driving position until the specific part of the adjustment pattern is at a specific part within the image area, and determining the driving positions for the remaining adjustment points on the basis of the driving positions for the adjustment points at the corners of the screen.

11. An automatic image adjustment device according to claim 3, wherein the operation in which said processing means calculates, from the driving position of the imaging means for imaging area containing the vertices of the first-mentioned rectangle, a driving position for imaging areas respectively containing vertices of a second rectangle larger than said first-mentioned rectangle on the screen, and said imaging means images areas respectively containing vertices of the second rectangle on the basis of said result of the calculation;

is repeated to determine driving positions for imaging areas respectively containing adjustment points at four corners of the screen.

* * * * *